United States Patent [19]

Kassai

[11] Patent Number: 4,610,460
[45] Date of Patent: Sep. 9, 1986

[54] BABY CARRIAGE

[75] Inventor: Kenzou Kassai, Osaka, Japan

[73] Assignee: Aprica Kassai Kabushikikaisha, Osaka, Japan

[21] Appl. No.: 602,161

[22] Filed: Apr. 19, 1984

[30] Foreign Application Priority Data

May 4, 1983 [JP] Japan .................................. 58-79804

[51] Int. Cl.⁴ .............................................. B62B 7/08
[52] U.S. Cl. .................................. 280/650; 280/642; 280/658
[58] Field of Search ............... 280/644, 642, 650, 647, 280/658, 643; 297/DIG. 4

[56] References Cited

U.S. PATENT DOCUMENTS 4,362,315 12/1982 Kassai .................................. 280/650
4,428,598 1/1984 Kassai .................................. 280/644
4,506,907 3/1985 Miyagi ................................. 280/642

Primary Examiner—John J. Love
Assistant Examiner—Eric D. Culbreth
Attorney, Agent, or Firm—W. G. Fasse; D. H. Kane, Jr.

[57] ABSTRACT

A baby carriage is equipped with handrails (1), front legs (2), sliders (3), rear legs (4), upper support rods (5), lower support rods (6), seat support rods (7), pull rods (8), and cross connecting members. The sliders (3) are slidable lengthwise of the front legs (2). The rear legs (4) are pivotally connected to the sliders (3). When the folding operation of the baby carriage is started, the handrails (1) are turned around connecting points (24) while the front legs (2) are turned around pivot points (25). With this turning movement, the sliders (3) are pulled by the pull rods (8) to slide upwardly along the front legs (2) while the rear legs (4) are turned around the connecting points (26) of the sliders toward the front legs (2).

7 Claims, 12 Drawing Figures

BABY CARRIAGE

BACKGROUND OF THE INVENTION

1. Field of the Invention

This invention relates to improvements in a baby carriage and particularly to improvements in a folding mechanism used in a baby carriage of chair type construction.

2. Description of the Prior Art

Heretofore, baby carriages of various types of basic construction have been proposed and put to practical use. Among baby carriages of such basic constructions, there has been proposed one having a chair type basic construction. Further, there has been proposed a foldable version of such a chair type baby carriage.

However, such a foldable chair type baby carriage has many items that remain to be improved. More particularly, it is required, as a matter of course, that such type of baby carriage remains stable at all times when a baby is placed therein. Generally, when a baby is placed in a baby carriage, the feet are positioned forward and most of the body rearward. As a result, the center of gravity of the baby supported by the baby carriage is positioned in the rear of the baby carriage. Recently, baby carriages with a mechanism for reclining the backrest have often been proposed, and in such baby carriage, when the backrest is reclined, the center of gravity of the baby is moved further rearward. In such a situation, to stably support the baby, the carriage rear legs having rear wheels must be extended toward the rear to a relatively long extent. In conventional baby carriages, however, because of their construction having long rear legs, the folding of the baby carriage results in the front wheels attached to the front legs being positioned above the rear wheels and hence it is difficult for the baby carriage to stand by itself in its folded state.

SUMMARY OF THE INVENTION

Accordingly, a principal object of this invention is to provide a baby carriage capable of stably supporting a baby. Further, when the baby carriage is folded the front and rear wheels are to be positioned at the same level to enable the baby carriage to stand by itself.

A baby carriage according to this invention basically comprises a pair of handrails, a pair of front legs, a pair of sliders, a pair of rear legs, a pair of upper support rods, a pair of lower support rods, a pair of seat support rods, a pair of pull rods, and widthwise connecting means. The widthwise connecting means serve to connect the opposite lateral sides of this baby carriage to each other. Each carriage side includes, front leg, a slider, a rear leg, an upper support rod, a lower support rod, a seat support rod, and a pull rod.

Each handrail is positioned to extend back and forth and has the front leg pivotally connected thereto at a relatively forward position. Each front leg has a front wheel at its lower end. Each slider is attached to the associated front leg and is slidable lengthwise of the front leg. Each rear leg is turnably connected to the associated slider. Further, each rear leg has a rear wheel at its lower end.

Each upper support rod is turnably connected at its upper end to the associated handrail at a relatively rearward position. Each lower support rod is turnably connected at one end thereof to the middle portion of the associated rear leg and at the other end thereof to the associated upper support rod. Each seat support rod is turnably connected at its front end to the middle portion of the associated front leg and at its rear end to the upper and lower support rods near the connection between the upper and lower support rods. Each pull rod connects the portion of the handrail positioned forwardly of the pivot point of the front leg to the slider.

In the basic construction described above, the upper support rod and rear leg are foldably connected by the lower support rod, whereby depending upon whether the lower support rod is turned to the upper position or to the lower position, the lower end of the upper support rod is brought to the relatively upper or lower position relative to the rear leg. When the lower end of the upper support rod is brought to the relatively upper position relative to the rear leg, the seat support rod, lower support rod, and rear leg define a triangle, thereby establishing the open state of the baby carriage. The shape and construction of the associated members are so selected that when the lower end of the upper support rod is brought to the relatively lower position relative to the rear leg, the seat support rod, lower support rod and rear leg become substantially parallel to each other, thereby establishing the closed state of the baby carriage.

In this way, the basic construction of the foldable chair type baby carriage is attained.

According to the baby carriage of this invention having such a basic construction, since the rear legs are turnably connected to the sliders adapted to slide upward along the front legs with the folding operation of the baby carriage, the rear legs can be extended relatively long toward the rear so as to stably support the baby in the open state of the baby carriage, and in the closed state of the baby carriage the front and rear wheels can be positioned at the same level to thereby enable the baby carriage to stand by itself in its closed state. Most of the conventional foldable baby carriages have their rear legs turnably connected to the handrails, but the baby carriage according to this invention, as compared with conventional baby carriages, has a novel construction below the seat and adjacent to the handrails. Additionally, the present carriage has an improved external appearance.

The aforesaid and other objects and features of this invention will become more apparent from the following detailed description to be given with reference to the drawings.

DESCRIPTION OF THE PREFERRED EMBODIMENT AND THE BEST MODE OF THE INVENTION

Figure 1:
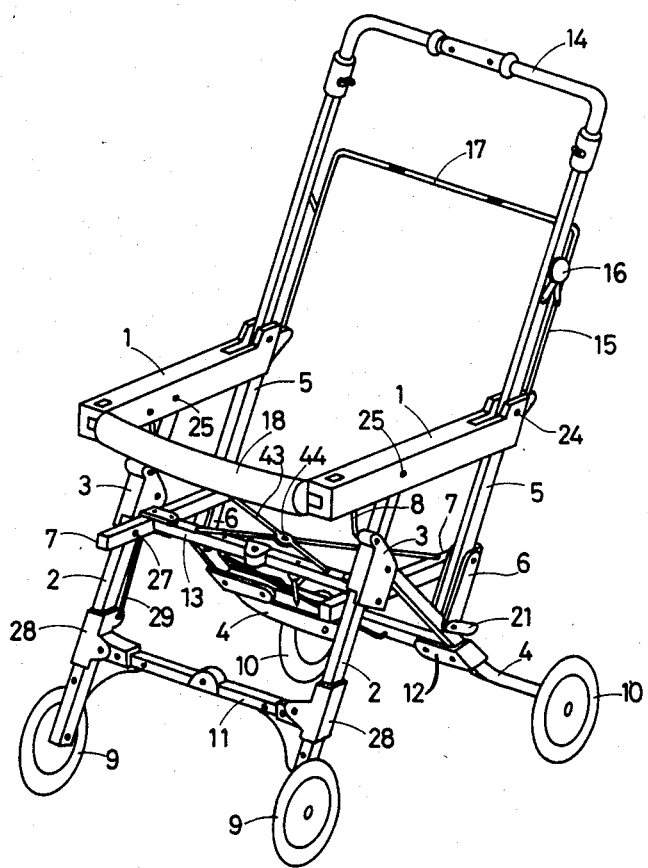
FIG. 1 is a perspective view of a baby carriage according to an embodiment of this invention.
Figure 2:
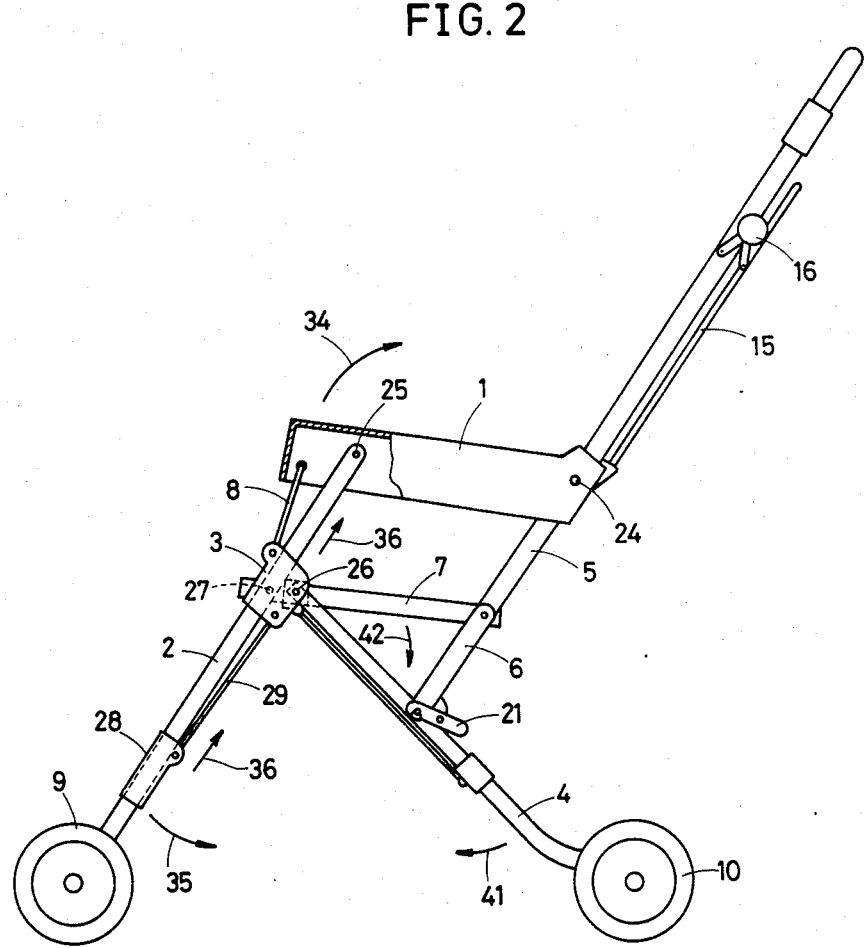
FIG. 2 is a right-hand side view of the baby carriage shown in FIG. 1.
Figure 3:
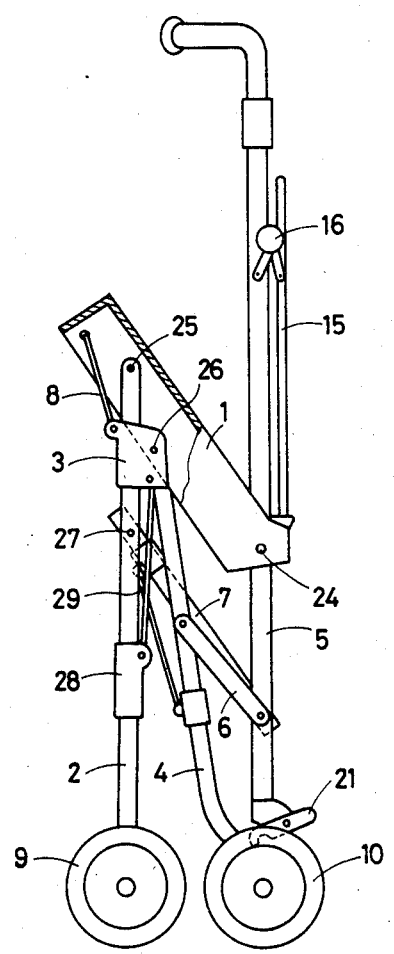
FIG. 3 is a view corresponding to FIG. 2, showing the folded state of the baby carriage.

A baby carriage shown in FIGS. 1 to 3 is introduced as a preferred embodiment of this invention having the aforesaid basic arrangement. In this embodiment, cross connecting means for connecting the right-hand and left-hand sides of the baby carriage comprise a front leg connecting member 11 connected between a pair of front legs 2 each having a front wheel 9, a rear leg connecting member 12 connected between a pair of rear legs 4 each having a rear wheel 10, and a central connecting member 13 connected between a pair of seat support rods 7. The baby carriage illustrated is designed so that its open state widths are decreased when the baby carriage is folded. That is, the front leg connecting member 11, the rear leg connecting member 12, and the central connecting rod 13 are foldable at their middle, the folding action causing the right-hand and left-hand sides of the baby carriage to move toward each other.

As shown, upper support rods 5 extend upwardly beyond respective handrails 1 to thereby form a pair of push rods. A push rod-connecting rod 14 is connected between said push rods 5. This push rod-connecting rod 14 is also a member of said cross connecting means. The push rod-connecting rod 14 is turnably connected at its opposite ends to the push rods 5 and is foldable at its middle. Further, a backrest member 15 is attached to the push rods 5 at their relatively upper portions. The backrest member 15 is adapted to be inclined more rearwardly than its illustrated state, by means of a reclining device 16. The backrest member 15, as shown in FIG. 1, has a cross connecting portion 17 which is a member of the cross connecting means. This cross connecting portion 17 is foldable at its middle, as in the other members. The cross connecting means further include a handrail connecting member 18 made of flexible material and removably attached to the handrails 1.

When it is desired to fold the baby carriage which is in the open state as shown in FIG. 1 or 2, the operator moves the push rod connecting member 14 in the forward direction by pressing the central portion thereof while pulling the handrail connecting member in an upward direction. Thereupon, the lower ends of the push rods 5 are brought to a relatively lower position relative to the rear legs 4, whereby the folded state of the baby carriage shown in FIG. 3 is established. With this folding movement, the members of the cross connecting means are folded at their middles, so that when the baby carriage is in the folded state, the right-hand and left-hand sides of the baby carriage are positioned close to each other.

The arrangement and folding operation of the respective parts will now be described.

Figure 4A:
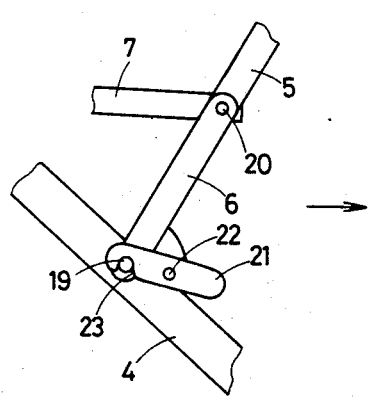
FIGS. 4a and 4b are two side views in which connections of a rear leg, of upper and lower support rods, and of a seat support rod are shown in the course of change from the open state shown in FIG. 4a to the closed state of the baby carriage shown in FIG. 4b.
Figure 4B:
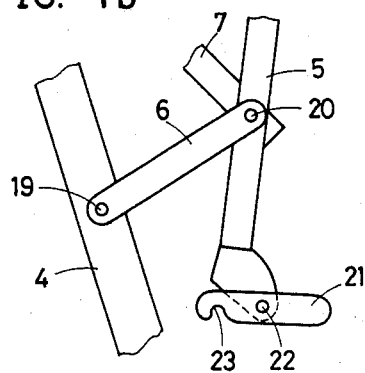

FIG. 4a and 4b show a right-hand side view showing of the connecting portions of the rear leg 4, the push rod 5, lower the support rod 6, and the seat support rod 7, whereby FIG. 4a shows the open state of the baby carriage and FIG. 4b shows a state on the way to the closed state. The lower support rod 6 is turnably connected at its lower end to the rear leg 4 through a locking pin 19 and at the other end thereof is connected to the push rod 5 through a pin 20. In this embodiment, the rear end of the seat support rod 7 is also turnably connected to the push rod 5 and lower support rod 6 through the pin 20. In the open state of the baby carriage, the lower end of the push rod 5 extends into contact with the rear leg 4. A locking lever 21 is turnably connected to the push rod 5 adjacent the lower end thereof through a pin 22. The locking lever 21 has an engaging recess 23 which, in the open state of the baby carriage, is adapted to lock the locking pin 19 projecting from the lower support rod 6. In the locked state locking pin 19 is locked by the locking recess 23 of the locking lever 21, whereby the lower support rod 6 is inhibited from turning around the axis of the locking pin 19, and in this manner the lower support rod 6, the seat support rod 7, and the upper portion of the rear leg 4 cooperate with one another to define a triangle, whereby the open state of the baby carriage is fixed. To maintain this fixed state more firmly, a twist spring, for example, may be attached to the locking lever 21 to urge it in the direction which causes the locking recess 23 to lock the locking pin 19.

And when the baby carriage is to be folded, first the locking lever 21 is turned clockwise as viewed in the figure so as to cancel the locking between the locking recess 23 and the locking pin 19, and then a folding force is applied by pressing the push rod connecting member 14 positioned above the push rod 5 in the forward direction, whereupon the push rod 5 is turned around a connecting point 24 (see FIGS. 1 to 3) at which it is connected to the handrail 1. Thus, as shown in FIG. 4b, the lower support rod 6 is turned clockwise, as viewed in the figure, around the axis of the locking pin 19 and the lower end of the push rod 5 is moved to a relatively lower position relative to the rear leg 4.

When it is desired to reestablish the open state shown in FIG. 4a, basically this can be attained by performing the aforesaid operation in the reverse order to cause the reverse operation to proceed.

Figure 5:
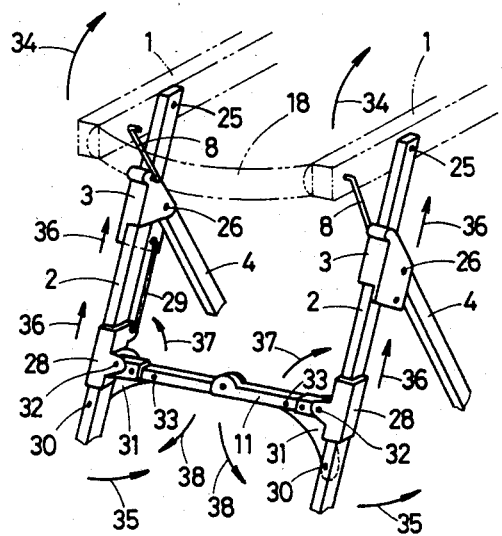
FIG. 5 is a perspective view looking toward the front of the carriage illustrating a connecting arrangement for handrails, front legs, sliders, rear legs, and front leg connecting members, with the baby carriage in the open state.
Figure 6:
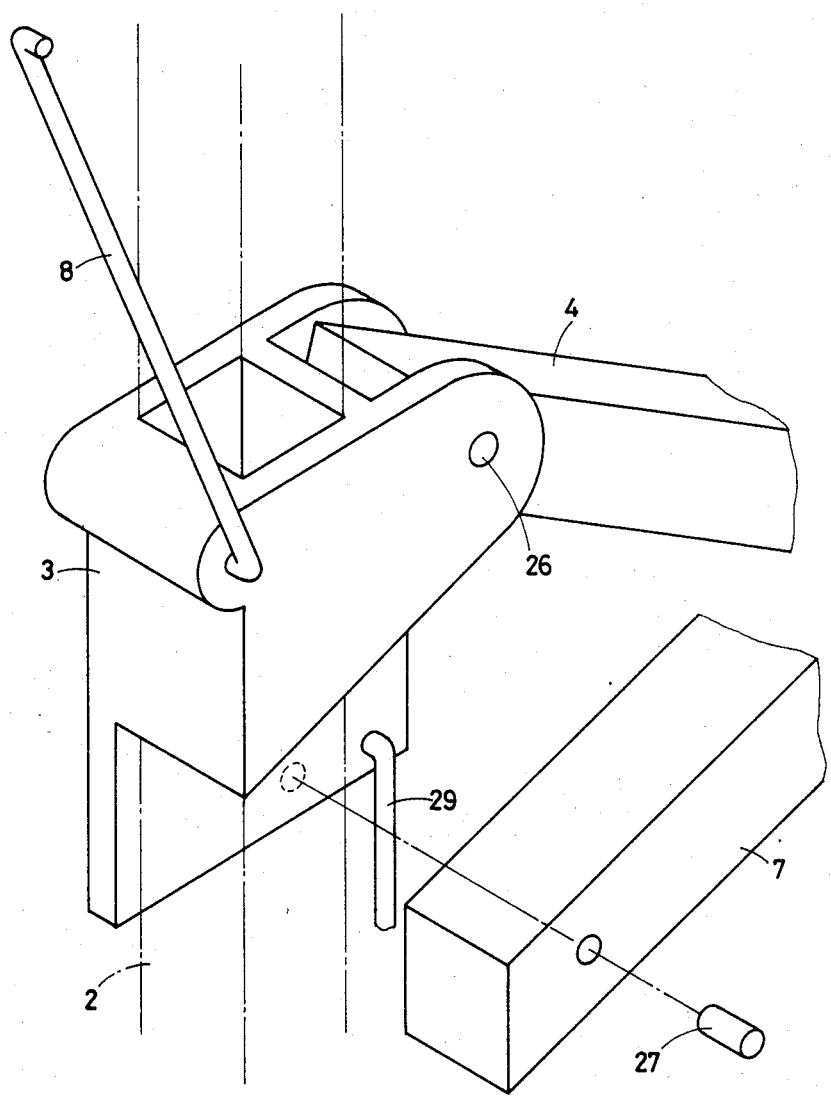
FIG. 6 is a perspective view of a slider positioned on the left-hand side of the baby carriage, illustrating a connecting arrangement for the slider and other members.

FIG. 5 is a front perspective view showing the connecting arrangement of the handrails 1, the front legs 2, the sliders 3, the rear legs 4, and the front leg connecting member 11, the baby carriage being in the state; for convenience, the seat support rods 7 are omitted from illustration. FIG. 6 is a top perspective view showing the slider positioned on the left-hand side of the baby carriage, clarifying the connecting arrangement for the slider and other members and their positional relation.

The front legs 2 are connected to the handrails 1 so that they can be turned around the pivot points 25. Each slider 3 is disposed on the associated front leg 2 so that it is slidable in the direction of the length of the front leg 2. The rear legs 4 are turnably connected to the rear portions of the sliders 3 through pins 26. As already described, the portion of the front leg 2 positioned forwardly of the pivot point 25, and the slider 3 are connected by a pull rod 8 to the respective hand rail 1. As best shown in FIG. 6, each of the pair of seat support rods 7 is turnably connected at its front end to the inwardly directed surface of the associated front leg 2 by a pin 27. The inwardly directed surface of each slider 3, as best shown in FIG. 6 is reduced in its downward dimension as compared with its outwardly directed surface. This is for the purpose of preventing the slider 3 and the seat support rod 7 from contacting each other when the slider 3 slides to the predetermined lower position.

The front leg connecting member 11 is downwardly foldable at its middle. To achieve the folding movement of the front leg connecting member 11, the latter is connected through links to members which constitute the sides of the baby carriage. More particularly, the links include a pair of movable members 28 attached to the respective front legs 2 and slidable in the direction of the length of the front legs 2, bar links 29 connected between the movable members 28 and sliders 3, and a pair of arms 31 extending inwardly from the front legs 2 and turnably connected thereto through pins 30. The front leg connecting member 11 is turnably connected at its opposite ends to the movable members 28 through pins 32. Further, the front leg connecting member 11 is turnably connected to the arms 31 by pivot pins 33 disposed at predetermined positions spaced a predetermined distance from each end.

Figure 7:
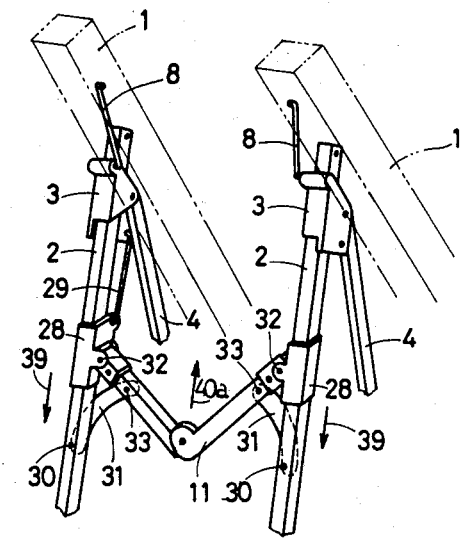
FIG. 7 is a perspective view showing the folded state of the front legs.

Therefore, when the folding operation of the baby carriage is started by upwardly pulling the handrail connecting member 18 shown in phantom lines in FIG. 5, the handrails 1 are turned around the connecting points 24 in the direction of arrows 34 in FIG. 5 or 2, while the front legs 2 are turned around the pivot points 25 in the direction of arrows 35. With this turning movement the sliders 3 are pulled by the pull rods 8 to slide upwardly, in the direction of arrows 36, along the front legs 2. Since the movable members 28 to which the front leg connecting member 11 is turnably connected are connected to the sliders 3 by the bar links 29, they will move upwardly along the front legs 2 in response to the upward slide movement of the sliders 3. In response thereto, the arms 31 are turned in the direction of arrows 37, while the front leg connecting member 11 is turned around the axes of the pivot pins 33 in the direction of arrows 38 through the pins 32 whereby it is downwardly folded. The state in which the front leg connecting member 11 is downwardly folded is shown in FIG. 7.

On the other hand, when a force opposite to that produced in the aforesaid operation, is applied to the open carriage, the carriage will tend to stay open. Such an opposite force pushes the handrails 1 downwardly when the baby carriage is in the open state. This opposite force is produced by the weight of a baby placed in a hammock installed so as to be connected to the handrails 1, whereby the movable members 28 are urged downwardly in the direction of arrows 39 in FIG. 7 through the pull rods 8, the sliders 3, and the bar links 29 and, whereby the opposite ends of the front leg connecting member 11 connected to the movable members 28 are urged downwardly, i.e., in the direction of arrows 39, so that the front leg connecting member 11 is urged to unfold upwardly, i.e., in the direction of arrow 40a. Thus, the ends of the member 11 are prevented from turning in the direction of arrows 38 (FIG. 5). That is, the greater the load, the more firmly the open state of the baby carriage is maintained.

In this embodiment, the bar links 29 are connected at one of their respective ends to the movable members 28 for producing a force for sliding the movable members 28. The other ends of the members 28 are connected to the sliders; however, said other ends may be connected to other points, e.g., on the handrails 1.

Figure 8:
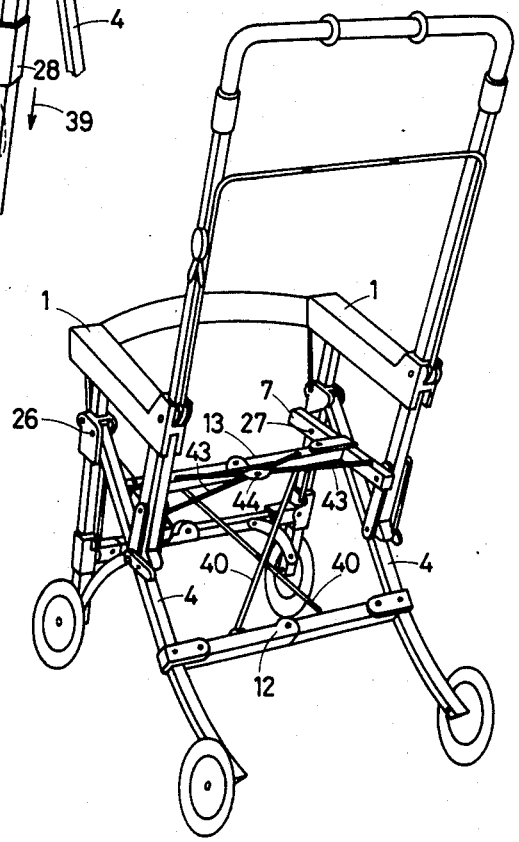
FIG. 8 is a rear perspective view of the baby carriage in the open state.

FIG. 8 is a rear perspective view of the operative connecting portions of the seat support rods 7, central connecting member 13, rear legs 4, and rear leg connecting member 12, with the baby carriage shown in its open state.

Referring to FIGS. 1 and 8, the central connecting rod 13 turnably connected at its opposite ends to the seat support rods 7 and is foldable at its middle. The rear leg connecting rod 12 is also turnably connected at its opposite ends to the rear legs 4 and is foldable at its middle rearwardly or downwardly. As shown, to establish an operative association between the folding movements of the central connecting member 13 and the rear leg connecting member 12, a pair of prop rods 40 is connected between the central connecting member 13 and the rear leg connecting member 12. The prop rods 40 are turnable with respect to the central connecting member 13 and the rear leg connecting member 12.

As is clear from FIGS. 2, 3, and 8, in the folding operation of the baby carriage, the rear legs 4 are turned around the axes of the pins 26 in the direction of arrow 41 while the seat support rods 7 are turned around the axes of the pins 27 in the direction of arrow 42, whereby the distance between the point of connection between the central connecting member 13 and the seat support rods 7 and the point of connection between the rear leg connecting member 12 and the rear legs 4 is reduced. Therefore, the prop rods 40 exert a propping force on the central connecting member 13 and on the rear leg connecting member 12, whereby the central connecting rod 13 and the rear leg connecting rod 12 are folded forwardly and rearwardly, respectively.

On the other hand, when a force opposite to that produced in the aforesaid operation is applied, i.e., when a force is applied which causes the point of connection between the central connecting rod 13 and the seat support rods 7 to move away from the point of connection between the rear leg connecting rod 12 and the rear legs 4 to establish the open state of the baby carriage, the prop rods 40 exert a pulling force on the central connecting rod 13 and on the rear leg connecting member 12, whereby the state shown in FIG. 8 is established.

In addition, as shown in FIGS. 1 and 8, a pair of reinforcing rods 43 are connected between the central connecting member 13 and the portion of the seat support rod 7 positioned rearwardly of the point of connection between the central connecting member 13 and the seat support rod 7. The reinforcing rods 43 are turnably connected together at their intersecting point 44 and their opposite ends are turnable relative to the central connecting member 13 and relative to the seat support rods 7. Therefore, they do not interfere with the aforesaid folding movement of the central connecting member 13. The reinforcing rods 43 prevent the widthwise swaying of the baby carriage and ensure sufficient support of the seat to be installed on the seat support rods 7.

Figure 9:
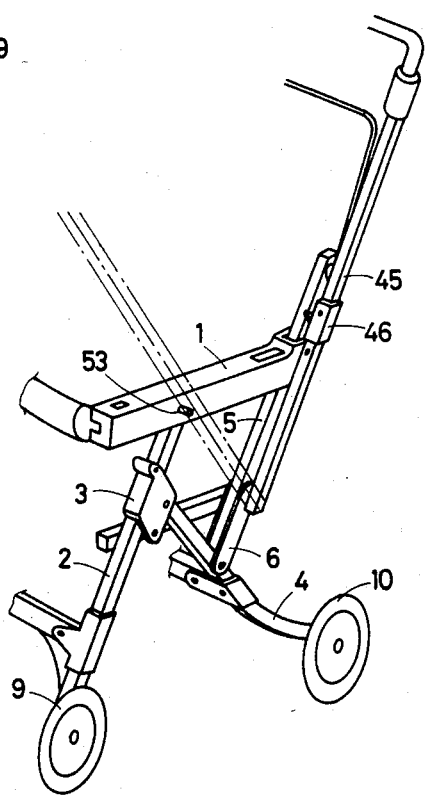
FIG. 9 is a perspective view of a baby carriage according to another embodiment of this invention, showing only the right-hand side of the baby carriage.

In the embodiment described with reference to FIGS. 1 to 8, the upper support rods 5 are turnably connected at their upper ends to relatively rear portions of the handrails 1 and extend upwardly beyond the handrails 1, thereby forming a pair of push rods. However, the baby carriage may be one in which the upper support rods are constructed separately from the push rods. One such embodiment is shown in FIG. 9. In the baby carriage shown in FIG. 9, as compared with the one shown in FIG. 1, it is seen that the push rods 45 are formed of members separate from the upper support rods 5. Each push rod 45 is turnably installed through the pin 20 (FIG. 4a–4b) which connects the lower support rod 6, the upper support rod 5, and the seat support rod 7. The position of the push rod 45 shown in phantom lines indicates the forwardly inclined state. It is necessary that the turning movement of the push rod 45 be inhibited at the rear position shown in solid lines and at the front position shown in phantom lines. For this purpose, the following arrangement may be made.

Figure 10:
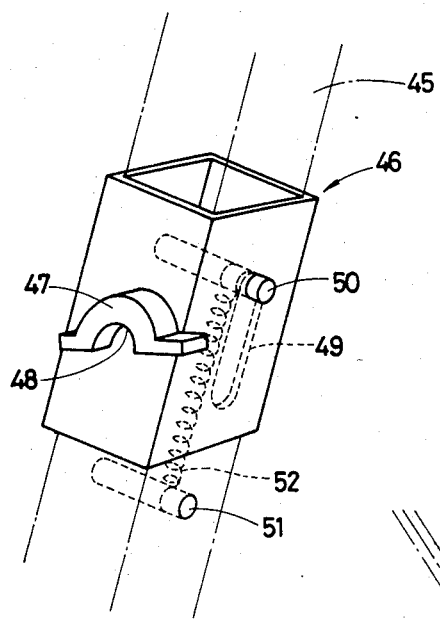
FIG. 10 is a perspective view looking from inside the baby carriage at a turning stop member attached to a push rod of the baby carriage shown in FIG. 9.

The push rod 45 has a turning stop member 46 attached thereto, which is slidable vertically along the push rod. FIG. 10 is a perspective view looking at the turning stop member 46 from inside the baby carriage. As is clear from this figure, the turning stop member 46 has a projection 47 on its surface directed to the inside of the baby carriage. The projection 47 has a downwardly opened locking recess 48. The push rod 45 has a vertically extending elongated opening 49, while the turning stop member 46 has a pin 50 extending through said elongated opening 49. Thus, the turning stop member 46 is vertically slidable within the range in which the pin 50 is movable in the elongated opening 49. The push rod 45 has a pin 51 fixed thereto in a portion below the elongated opening 49. The pins 50 and 51 are connected by a tension spring 52, whereby the turning stop member 46 is constantly urged to slide downwardly.

Though not fully visible in FIG. 9 because of the presence of the push rod 45, the upper support rod 5 has a locking pin projecting from its lateral surface, said locking pin being engageable by the locking recess 48 of the turning stop member 46. Further, the handrail 1 also has a locking pin 53 projecting from its lateral surface, said locking pin being engageable by the locking recess 48 of the turning stop member 46. Thus, when the push rod 45 is in the rear position, its turning is inhibited by the engagement between the locking recess 48 and the locking pin fixed to the upper support rod 5, whereas when it is in the front position, its turning is inhibited by the engagement between the locking recess 48 and the pin 53. When it is desired to turn the push rod from its rear position to its front position or vice versa, the operator upwardly slides the turning stop member 46 against the force of the tension spring 52 to cancel the engagement between the locking recess 48 and the locking pin.

Figure 11:
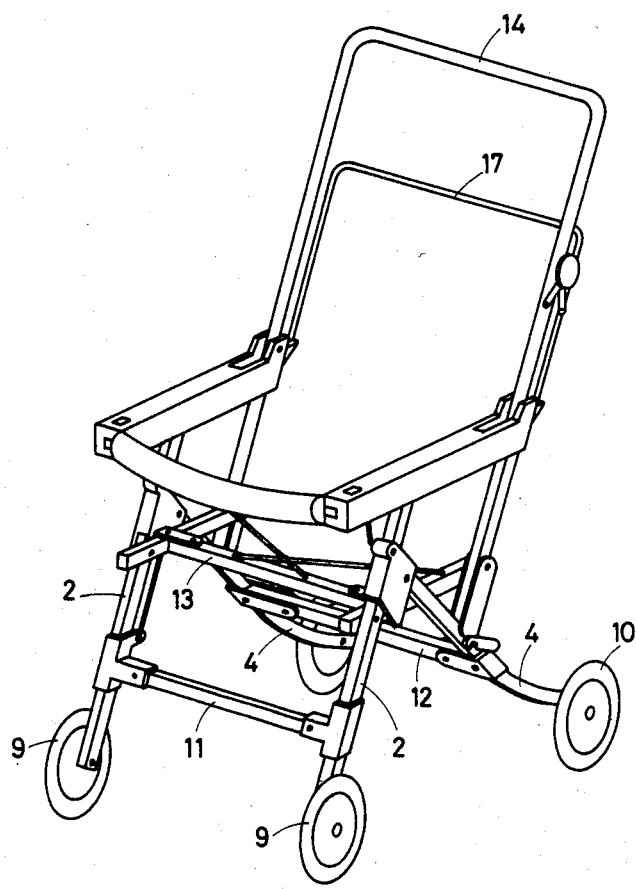
FIG. 11 is a perspective view of a baby carriage according to a further embodiment of this invention.

The difference between the baby carriage illustrated in FIG. 11 and the one shown in FIG. 1 lies in the cross connecting means for connecting the right-hand and left-hand sides of the baby carriage. There is no difference in other respects expects that, the baby carriage shown in FIG. 11 is of such a construction that, its crossing dimension is not reduced when the baby carriage is folded. The front leg connecting member 11, the rear leg connecting member 12, the central connecting member 13, the push rod connecting member 14, and the cross connecting portion 17 are not foldable, unlike in the preceding embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage having a right-hand side and a left-hand side normally spaced from each other by a given width from side to side, comprising a pair of handrails, a pair of front legs respectively turnably attached to relatively front portions of said handrails at respective pivot points, each front leg having a front wheel, a pair of sliders respectively attached to said front legs, so that said sliders are slidable in the direction of the length of said front legs, a pair of rear legs respectively turnably attached to said sliders, each rear leg having a rear wheel, a pair of upper support rods respectively turnably attached at their middle portions to relatively rear portions of said handrails, a pair of lower support rods turnably attached at one of their respective ends to respective middle portions of said rear legs and at their other ends to said upper support rods, a pair of seat support rods turnably attached at their front ends to the respective middle portions of said front legs, said seat support rods having rear ends turnably connected to said upper support rods and said lower support rods approximately where said upper and lower support rods are connected to each other, a pair of pull rods positioned forwardly of said pivot points for connecting said sliders on said front legs to said handrails, and cross-connecting means for connecting said right-hand and left-hand sides of the baby carriage to each other, each side including one front leg, one slider, one rear leg, one upper support rod, one lower support rod, one seat support rod, and one pull rod.

2. The baby carriage of claim 1, wherein said cross-connecting means include a front leg connecting member connected between said front legs, a rear leg connecting member connected between said rear legs, and a central connecting member connected between said seat support rods.

3. The baby carriage of claim 2, wherein said front leg connecting member, said rear leg connecting member, and said central connecting member are not foldable.

4. The baby carriage of claim 2, wherein said front leg connecting member, said rear leg connecting member, and said central connecting member are foldable at their middles, their folding movement bringing said right-hand and left-hand sides of the baby carriage close to each other, said baby carriage further including link means for connecting said baby carriage sides to said front leg connecting member for permitting folding of said front leg connecting member, and prop rods connected between the rear leg connecting member and the central connecting member for establishing an operative association between the folding movements of said rear leg connecting member and said central connecting member.

5. The baby carriage of claim 4, wherein said link means include a pair of movable members respectively attached to said front legs for sliding in the direction of the length of said front legs, bars connected between said movable members and said sliders, and a pair of turnably installed arms respectively extending from said front legs, and wherein said front leg connecting members are turnably connected at their opposite ends to said movable members and turnably connected to said arms at pivot points spaced a predetermined distance from each end.

6. The baby carriage of claim 1, wherein said upper support members extend upwardly beyond said handrails to form a pair of push rods.

7. The baby carriage of claim 1, further including a pair of push rods respectively turnably attached at their lower ends to the right-hand and left-hand sides of the baby carriage.

* * * * *